United States Patent
Bieri et al.

(12) 
(10) Patent No.: US 9,331,506 B1
(45) Date of Patent: May 3, 2016

(54) BATTERY RECHARGER AND HEATING APPARATUS

(71) Applicants: David E. Bieri, Hamburg, IA (US); Nancy R. Bieri, Hamburg, IA (US)

(72) Inventors: David E. Bieri, Hamburg, IA (US); Nancy R. Bieri, Hamburg, IA (US)

(*) Notice: Subject to any disclaimer, the term of this patent is extended or adjusted under 35 U.S.C. 154(b) by 250 days.

(21) Appl. No.: 14/222,844

(22) Filed: Mar. 24, 2014

(51) Int. Cl.
*H02J 7/00* (2006.01)

(52) U.S. Cl.
CPC .................................. *H02J 7/0042* (2013.01)

(58) Field of Classification Search
CPC . H01M 10/615; H01M 10/44; H01M 10/658; H02J 7/0091
USPC .......................................................... 320/111
See application file for complete search history.

(56) References Cited

U.S. PATENT DOCUMENTS

| | | | | |
|---|---|---|---|---|
| 2,710,937 A * | 6/1955 | Godshalk | .............. | H02J 7/0091 320/118 |
| 4,027,727 A * | 6/1977 | Pullens et al. | ........ | A47J 39/006 165/48.1 |
| 4,229,687 A * | 10/1980 | Newman et al. | ...... | H01M 10/44 320/112 |
| 4,874,921 A * | 10/1989 | Gerbig, Jr. et al. | | B60H 1/00264 219/202 |
| 5,643,480 A * | 7/1997 | Gustavsson et al. | ................... | A41D 13/0051 219/211 |
| 5,948,298 A * | 9/1999 | Ijaz et al. | .................. | B60L 1/08 180/68.5 |
| 7,446,508 B2 * | 11/2008 | Aradachi et al. | ...... | H02J 7/0091 320/150 |
| 8,082,615 B1 * | 12/2011 | Alkhattaf et al. | .... | A47C 21/003 5/655 |

* cited by examiner

*Primary Examiner* — Sun Lin
(74) *Attorney, Agent, or Firm* — Dennis L. Thomte; Thomte Patent Law Office LLC

(57) ABSTRACT

A battery recharger and heating apparatus, which is positioned within an insulated and weather proof chest, is disclosed. Electrical power is supplied to the apparatus to enable batteries to be charged in the insulated and weather proof chest and to remain in the insulated and weather proof chest until time of use. The interior of the insulated and weather proof chest is heated with a heating element such as a light bulb or heating pad.

9 Claims, 4 Drawing Sheets

BATTERY RECHARGER AND HEATING APPARATUS

BACKGROUND OF THE INVENTION

1. Field of the Invention

This invention relates to a battery recharger and heating apparatus and more particularly to an apparatus for recharging and heating rechargeable batteries in cold weather.

2. Description of the Related Art

It is well known that rechargeable batteries discharge more quickly in cold weather. As is also well known, the electric current generated by a battery is produced when a connection is made between its positive and negative terminals. When the terminals are connected, a chemical reaction is initiated that generates electrodes to supply the current of the battery. Lowering the temperature of the battery causes the chemical reaction to proceed more slowly; so if a battery is used at a low temperature, then less current is produced than at a higher temperature.

The discharge of the rechargeable batteries in use is very problematic for those workers using power tools with chargeable batteries in cold weather. To the best of Applicant's knowledge, no one has previously provided satisfactory means for recharging batteries in cold weather and to heat those batteries until they are used.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A battery recharger and heating apparatus is disclosed which includes an insulated chest having a bottom, opposite side walls and opposite end walls which define an interior compartment with an open upper end. The chest also has an insulated cover which is configured to selectively close the open upper end of the interior compartment. A first electrical cord, having inner and outer ends, extends through one of the side walls or end walls into the interior compartment of the chest. The outer end of the first electrical cord is adapted to be secured to a source of electrical power. An electrical outlet box is mounted in the interior compartment of the chest which is electrically connected to the inner end of the first electrical cord. Preferably, the electrical outlet box of the GFI type. An electrically operated thermostat is mounted in the interior compartment which is electrically connected to the outlet box. A heating element such as a light bulb or a heating pad is positioned in the interior compartment which is electrically connected to the thermostat. An electrical power strip is also mounted in the interior compartment which is electrically connected to the outlet box. The power strip is configured to have a plurality of battery rechargers electrically connected thereto.

A person using power tools in cold weather may recharge batteries in the chest and may leave the recharged batteries in the chest so they will remain warm due to the heat generated by the light bulb or the heating pad. The chest is weather proof so that it may be used at a jobsite.

The principal object of the invention is to provide a battery recharger and heating apparatus.

A further object of the invention is to provide a battery recharger and heating apparatus which includes an insulated chest wherein batteries may be recharged therein and may be heated until being used.

A further object of the invention is to provide a battery recharger and heating apparatus which will accommodate several batteries at the same time.

A further object of the invention is to provide a battery recharger and heating apparatus which is convenient to use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
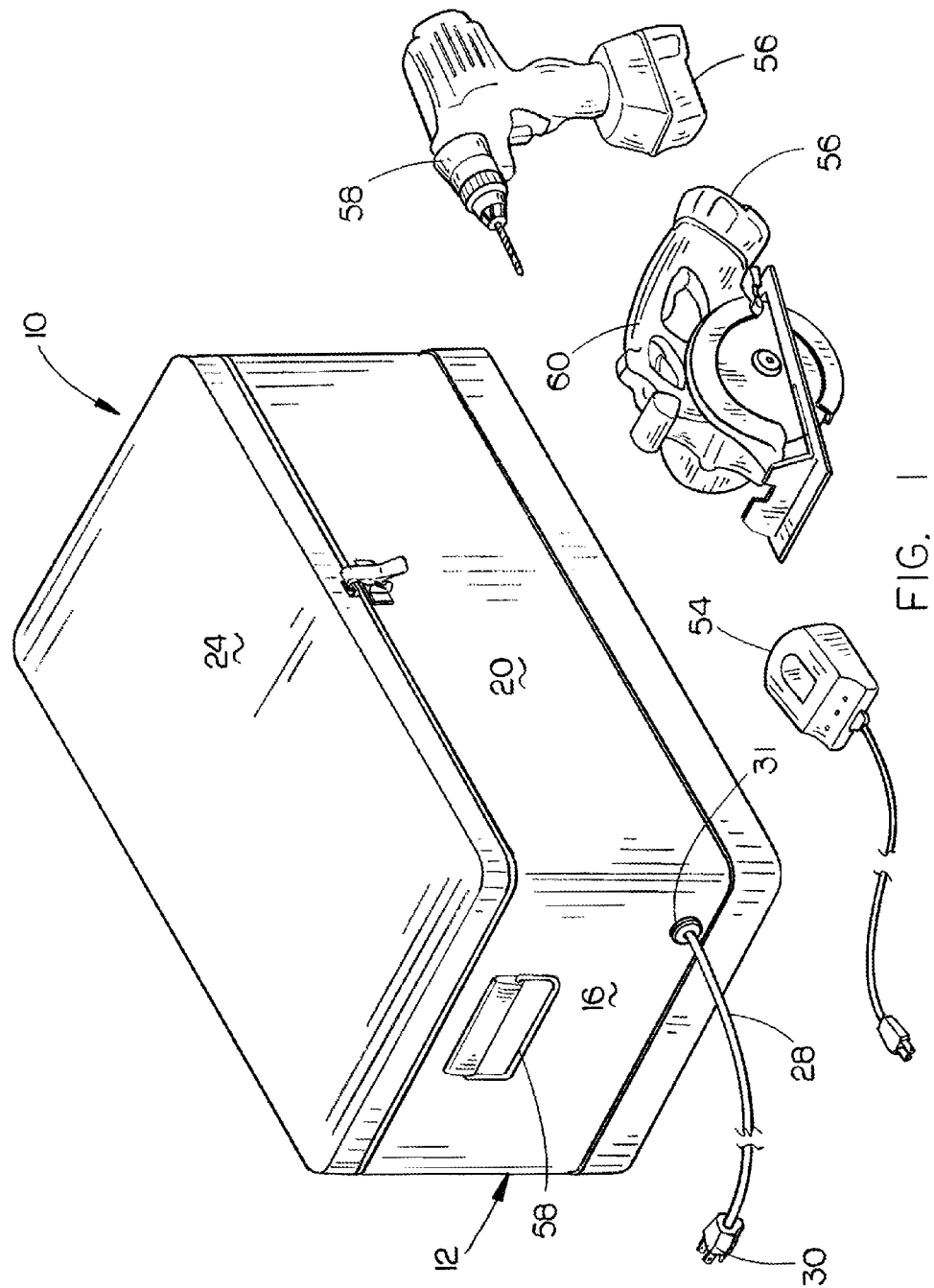
FIG. 1 is a perspective view illustrating the apparatus of this invention which is used to recharge and heat batteries with those batteries being used in power tools such as a saw or screw driver.
Figure 2:
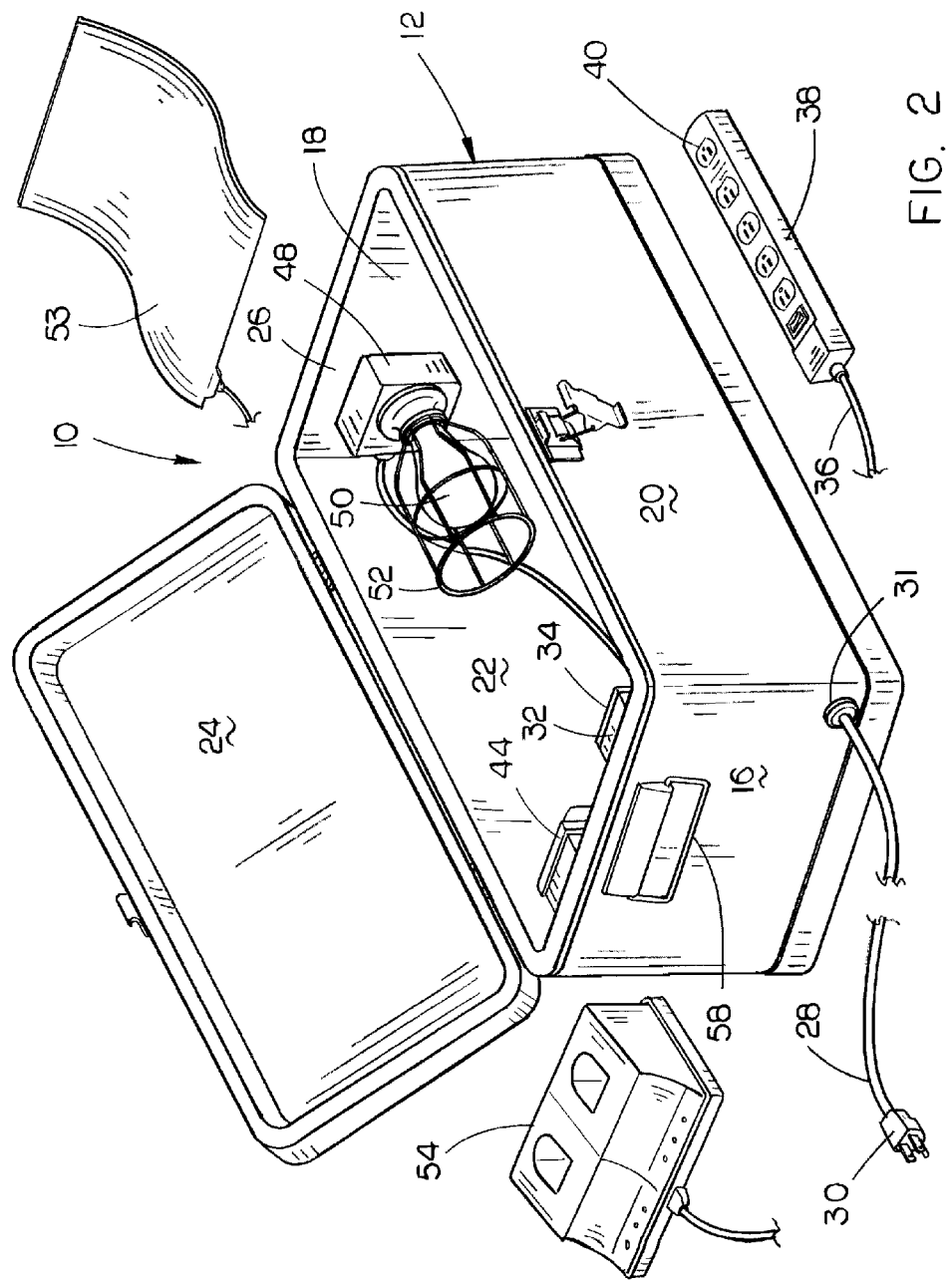
FIG. 2 is an exploded perspective view of the apparatus of this invention.
Figure 3:
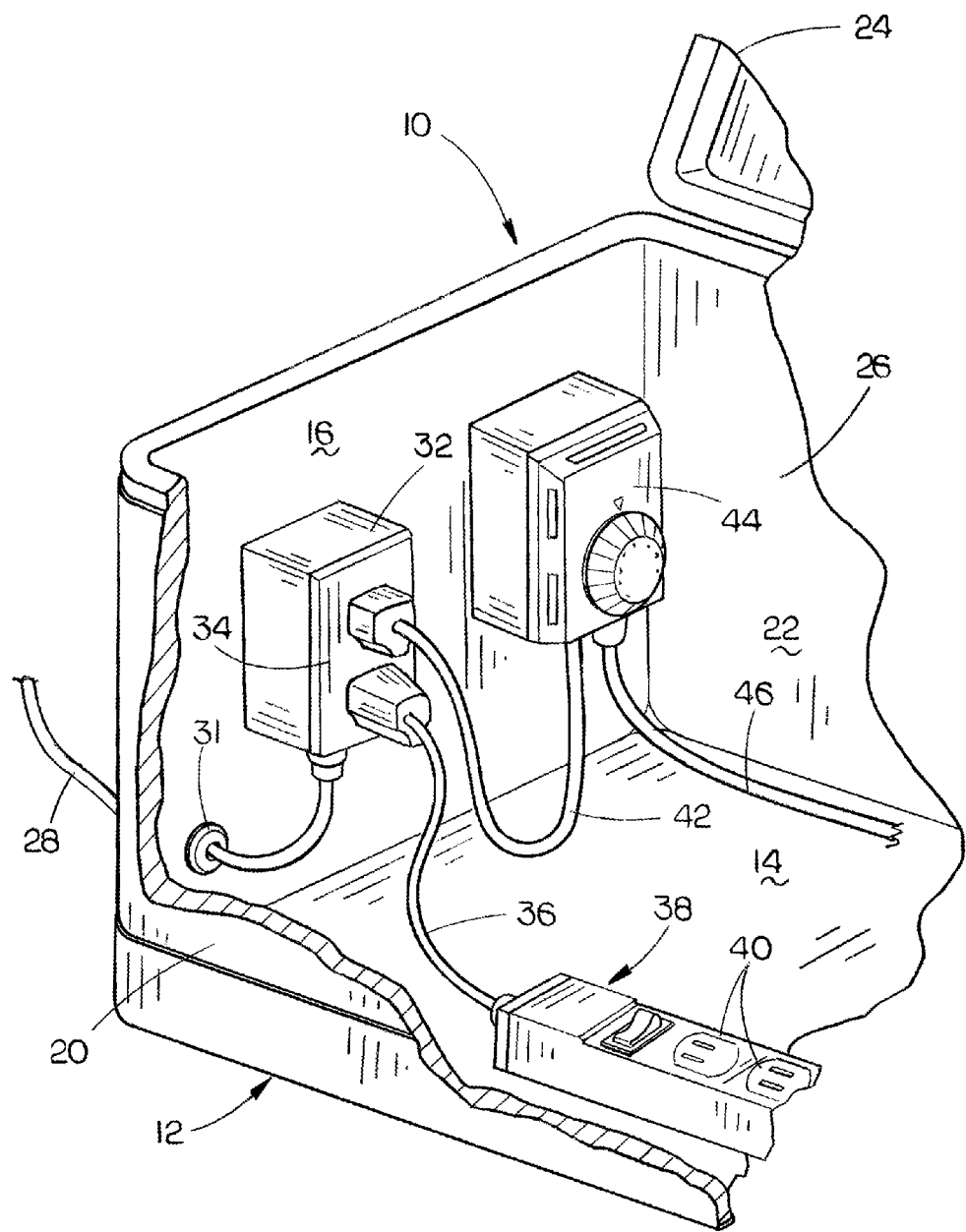
FIG. 3 is a partial perspective view of a portion of the interior of the apparatus of this invention.
Figure 4:
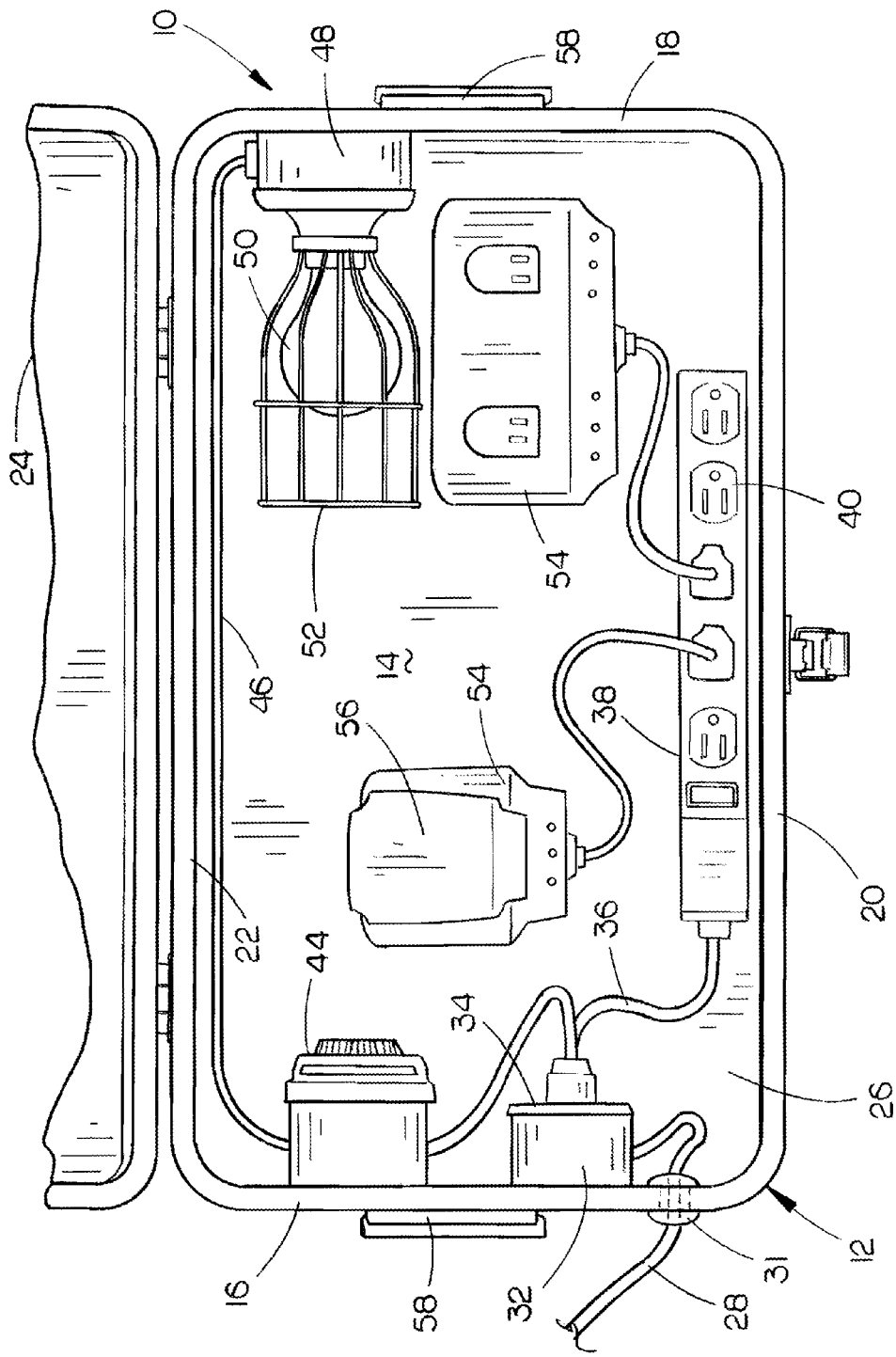
FIG. 4 is a partial top view of the apparatus of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The battery recharger and heating apparatus of this invention is referred to by the reference numeral 10. Apparatus 10 includes an insulated chest 12 such as used in cooler chests or the like. Chest 12 includes a bottom 14, a first end wall 16, a second end wall 18, a first side wall 20, a second side wall 22 and a cover or lid 24 which is hingedly secured to the upper end of side wall 20. The end walls 16, 18 and side walls 20, 22 define an interior compartment 26. The numeral 28 refers to an electrical cord having a plug 30 at its outer end. Cord 28 extends through an opening 31 in end wall 16 into interior compartment 26. The inner end of cord 28 is electrically connected to an outlet box 32 which is mounted on the inside surface of end wall 16 by screws, bolts, etc. and preferably is GFI protected as represented by the reference numeral 34.

An electrical cord, conduit or wire 36 is electrically connected to outlet box 32 and extends to a power strip 38 having a plurality of sockets 40 provided therein. An electrical cord, conduit or wire 42 is electrically connected to the GFI 34 and extends therefrom to an adjustable thermostat 44 which is mounted on the inside surface of end wall 16. An electrical cord, conduit or wire is electrically connected to thermostat 44 and extends to a heating element such as a light bulb junction box 48 having a light bulb 50 mounted thereon. Preferably, the box 48 is secured to the inside surface of end wall 18. Preferably, a protective cage 52 extends around the light bulb 50. The heating element could be a heating pad 53 positioned on the bottom 14 of chest 12. A plurality of battery rechargers 54 are plugged into the power strip 38 to recharge batteries 56. Preferably, the chest 12 is provided with handles 58 at either end thereof.

In use, the electrical cord 28 is connected to a source of electrical power at the jobsite or where the person is working in cold weather. The electrical cord 28 provides power to the power strip 38 which enables a plurality of battery chargers 54 to be simultaneously utilized. The electrical power supplied to the heating element and the thermostat 44 to maintain a proper amount of heat within the chest 12 so that the batteries 56 will remain heated until time of use thereby ensuring that the batteries 56 will have sufficient power to perform the task required.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A battery recharger and heating apparatus, comprising:
    an insulated chest having a bottom, opposite side walls and opposite end walls which define an interior compartment with an open upper end, and an insulated cover configured to selectively close and open said open upper end of said interior compartment;
    a first electrical cord, having an inner end and an outer end, extending through one of said side walls or end walls into said interior compartment;
    wherein said outer end of said first electrical cord is configured to be electrically connected to a source of electrical power;
    an electrical outlet box, which is in said interior compartment is electrically connected to said inner end of said first electrical cord;
    an electrically operated thermostat, which is positioned in said interior compartment is electrically connected to said electrical outlet box;
    a heating element, which is in said interior compartment, is electrically connected to said electrically operated thermostat; and
    an electrical power strip, which is in said interior compartment, is electrically connected to said electrical outlet box;
    wherein said electrical power strip is configured to have a plurality of battery rechargers electrically connected thereto.

2. The apparatus of claim 1 wherein said heating element comprises a light bulb.

3. The apparatus of claim 2 wherein said light bulb has a protective cage extending therearound.

4. The apparatus of claim 1 wherein said heating element comprises a heating pad.

5. The apparatus of claim 1 wherein said electrical outlet box is mounted on one of said side walls or said end walls.

6. The apparatus of claim 1 wherein said thermostat is mounted on one of said side walls or said end walls.

7. The apparatus of claim 2 wherein said light bulb is operatively mounted on one of said side walls or said end walls.

8. The apparatus of claim 1 wherein said insulated chest includes carrying handles.

9. The apparatus of claim 1 wherein said insulated chest and said insulated cover are weather proof.

* * * * *